(12) United States Patent
Becker

(10) Patent No.: US 9,851,209 B2
(45) Date of Patent: *Dec. 26, 2017

(54) SIGNATURE BASED MAP CACHING

(71) Applicant: Environmental Systems Research Institute, Inc., Redlands, CA (US)

(72) Inventor: Peter Becker, Redlands, CA (US)

(73) Assignee: ENVIRONMENTAL SYSTEMS RESEARCH INSTITUTE, INC., Redlands, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/500,624

(22) Filed: Sep. 29, 2014

(65) Prior Publication Data

US 2015/0088413 A1    Mar. 26, 2015

Related U.S. Application Data

(63) Continuation of application No. 12/981,333, filed on Dec. 29, 2010, now Pat. No. 8,880,589.

(51) Int. Cl.
*G06F 15/16* (2006.01)
*G01C 21/32* (2006.01)
*G09B 29/00* (2006.01)
*G01C 21/36* (2006.01)

(52) U.S. Cl.
CPC ......... *G01C 21/32* (2013.01); *G01C 21/3667* (2013.01); *G09B 29/004* (2013.01)

(58) Field of Classification Search
CPC ............... G01C 21/32; G01C 21/3415; G01C 21/3667; G01C 21/3407; G01C 21/3438; G01C 21/3453; G01C 21/3492; G01C 21/362; G01C 21/3691; G08G 1/096844;
(Continued)

(56) References Cited

U.S. PATENT DOCUMENTS 6,035,330 A    3/2000    Astiz et al.
8,880,589 B2    11/2014    Becker
(Continued)

OTHER PUBLICATIONS

Notice of Allowance for U.S. Appl. No. 12/981,333 dated Jun. 30, 2014, 13 pages.

(Continued)

*Primary Examiner* — Dustin Nguyen
*Assistant Examiner* — Hao Nguyen
(74) *Attorney, Agent, or Firm* — Kilpatrick, Townsend & Stockton LLP

(57) ABSTRACT

Systems, methods, and computing devices for building, operating and using map systems with signature-based map caches are disclosed. Based on the desired map properties included in a formatted map request, a map signature can be generated. The map signature can be used to access a signature based map cache to determine whether a map with identical map properties has been previously generated and stored in cache or otherwise available for retrieval. If the map signature exists in the map cache, the corresponding map can be delivered to a map client. If the map signature does not exist in the map cache, then a map can be generated or rendered based on the map properties in the map request. Once the map is generated, it can be saved to the map cache along with associated map signature for future retrieval.

20 Claims, 12 Drawing Sheets

(58) Field of Classification Search
CPC ........... G08G 1/096811; G08G 1/0967; G08G 1/096775
USPC .......................... 709/203; 707/755, 769, 770
See application file for complete search history.

(56) References Cited

U.S. PATENT DOCUMENTS

| | | | | |
|---|---|---|---|---|
| 2004/0243299 A1* | 12/2004 | Scaer | .................... | G06Q 10/08 701/522 |
| 2006/0184316 A1* | 8/2006 | Hultin | .................... | G01C 21/32 701/532 |
| 2007/0229524 A1 | 10/2007 | Hendrey et al. | | |
| 2007/0294024 A1* | 12/2007 | Sasaki | ................ | G01C 21/3415 701/532 |
| 2008/0077464 A1* | 3/2008 | Gottlieb | ................ | G06Q 10/08 705/28 |
| 2008/0109159 A1 | 5/2008 | Shi et al. | | |
| 2008/0147824 A1 | 6/2008 | Hendrey | | |
| 2008/0174593 A1 | 7/2008 | Ham et al. | | |
| 2008/0176583 A1 | 7/2008 | Brachet et al. | | |
| 2009/0183083 A1 | 7/2009 | Hedges | | |
| 2010/0020091 A1 | 1/2010 | Rasmussen et al. | | |
| 2010/0030466 A1* | 2/2010 | Rogers | ............... | G01C 21/3415 701/533 |
| 2010/0217480 A1 | 8/2010 | Link, II | | |
| 2010/0259370 A1* | 10/2010 | Chen | .................. | G01C 21/3438 340/425.5 |
| 2011/0035284 A1* | 2/2011 | Moshfeghi | ............. | G06Q 30/02 705/14.58 |
| 2011/0207446 A1 | 8/2011 | Iwuchukwu | | |
| 2012/0102009 A1 | 4/2012 | Peterson et al. | | |

OTHER PUBLICATIONS

Non-Final Office Action for U.S. Appl. No. 12/981,333 dated Jan. 22, 2013, 17 pages.
Final Office Action for U.S. Appl. No. 12/981,333 dated Jun. 19, 2013, 22 pages.
Non-Final Office Action for U.S. Appl. No. 12/981,333 dated Dec. 6, 2013, 30 pages.

* cited by examiner

910    $R(x,n) = [(A,1) : (B, 2)] = X_{910}$

920    $R(\text{lang, scale, color, bound}(x,n) = [\text{English}, 0.6, \text{scheme2}, (1, A) : (2, B)] = X_{920}$ 930    $\text{Hash}[X_{920}] = IDX_{920}$

*Fig. 9*

SIGNATURE BASED MAP CACHING

CROSS-REFERENCE TO RELATED APPLICATION

The present application is a Continuation of U.S. patent application Ser. No. 12/981,333, filed on Dec. 29, 2010, the entire disclosure of which is herein incorporated by reference in its entirety for all purposes.

BACKGROUND OF THE INVENTION

Various computer-based tools exist for designing, making, generating and otherwise providing custom maps. Most contemporary map tools call on at least one data store of map or geographical data for the raw or processed data used to produce custom maps. The data stores used include many different types of map and map related data. For instance certain databases include terrain, topology or image data, while other databases include street name data and other label data. Depending on the needs of the user and the application of the desired map, different pieces of data can be gathered from the available data stores to generate and/or render a custom map.

Examples of contemporary map generating systems are geographical information systems (GIS). Many contemporary GIS systems attempt to merge aspects of various fields, such as cartography, statistical analysis, or database technology and can be used for various applications such as cartography, remote sensing, land surveying, utility management, natural resource management, photogrammetry, geography, urban planning, emergency management, navigation or localized search engines. Accordingly, the term GIS system can generally refer to any information system that might be used to integrate, store, edit, analyze, share or display geographic information based on user created inquiries, searches, requests or the like to analyze spatial information, edit data or maps or present the results of any of such operations.

Depending on the complexity of the user created request, the processor power of the GIS system and the bandwidth of the network, generating a map can cause undesired delays and drain processer resources of the system or server. Various schemes and systems have been developed to avoid delays and reduce the drain on processor resources associated with the generating and/or rendering of complex and custom maps.

For example, some systems define a number of variations of a particular selection or region of map data and generate a number of predetermined variants of maps for the region based on a set number of variables. The pre-generated variants of the map are then stored in a readily available memory such as a cache. Each pre-generated map is associated with a location, address, or identifier in the memory so it can be easily recalled. The location of the pre-generated regions, or map tiles, can then be recalled for display based on location of the region in a greater overall scheme. For example, larger maps can be constructed of a mosaic of smaller map tiles. Each map tile can be designated by and recalled based on relative or absolute positions of the individual map tiles in the composite map. Map systems that use such map tiles are referred to as tiled-based systems.

Tile-based map systems were originally developed to reduce the load placed on the CPU and disk read functions of map systems. Tile-based map services basically pre-render, store and return predefined map tiles. With such systems, map clients make simple map requests that conform to a tiling schema used by the tile-based map server. In some such systems, each map tile is identified by a unique identifier that is some combination of the row, column, and level identifiers of the map tile. Such map tiles are pre-generated and stored in memory, in which case they are often referred to as being a stored in cache.

The particular tile schema that the map clients uses to make the map requests is generally hardcoded into the client application or defined in some configuration file passed to the client application. Often the client systems directly access the tile using a "Get" request or the request is processed by a light or thin server component. To display a complete map, the client application stitches multiple map tiles together to form a composite mosaic of map tiles. If the map projection requested by the client application is different to that of the stored map tiles, the map tiles need to be re-projected or sampled by the client application, requiring a more advanced client application. Such map client applications stitch together multiple map tiles and perform sub-sampling between multiple resolutions to provide an interactive user environment. Map tiles are generally cached in local memory or to a disk accessible to the map client application to reduce multiple requests to a map generating server for the same tiles.

The main disadvantage of tile-based map services is the inability to change any property of the stored pre-rendered map tiles (i.e. projection, compression, rendering rule). Such systems assume the map imagery is a static mosaic and simply store a number of map tiles that can be retrieved based on their position in a larger map. In addition, most tile-based map services currently only use 8bit, 3-band imagery and as a result, image quality is often reduced due to the necessary resampling to create tiles that conform to the tiling scheme.

Although, tile-based servers provide for a high degree of scalability due to the very low load inflicted on the map server, they offer limited flexibility and also require a significant time and resource investment in the map tile server setup phase to generate map tiles that may never be accessed. To avoid some of the setup investment, some tile-based map servers are connected to dynamic map services for producing on-demand map tiles. In such on-demand architectures, map tiles are created by the dynamic map server only when required and only if they do no already exist in the map cache.

The combined use of tile-based based and dynamic map services can increase the flexibility and quality of a map service. Allowing map clients to arbitrarily define the extent, i.e. the size, and boundaries, i.e. columns and rows, of the current display/view shown to a user on the client system, presents a problem for determining whether the requested map exists as a previously generated map in the map cache and then generating the map if it has not. Non-uniform map requests received from different map clients can make it difficult or impossible to verify whether a particular map has been generated and available in cache. Various systems exist for processing the map request to generate a portion of the requested map, however, such processing can inflict an undue strain on the processing power, and disk read capabilities of the map service servers.

As such, there is a need to increase the flexibility of the tile-based map services while also decreasing the load on the map servers of a dynamic map server. Embodiments of the present invention address these and other issues.

BRIEF SUMMARY

Various embodiments of the present invention are directed toward methods for operating a map server comprising a processor, a cache memory and a network interface. The method can include receiving a map request from a map client over the network interface and generating and/or obtaining a map signature based on the map request. In some embodiments, generating the map signature includes applying a hash function to the map request. The map server can then access the cache memory and determine if the cache memory includes the map signature. If the cache memory includes the map signature, then the map server can retrieve a map associated to the map signature from the cache memory. If the cache memory does not include the map signature, then the map server can generate a map based on the map request. When a new map tile is generated, it can be associated with the map signature and both can be stored to the cache memory. The method can also include sending the retrieved or generated map associated with the map signature over the network interface to the map client.

In some embodiments, storing the generated map and the map signature to the cache memory includes sending the generated map and the map signature to a cache manager server computer. In related embodiments, the method can also include the cache manager server computer updating the cache.

In other embodiments, receiving the map request can include converting the map request to a uniform format that the map server can uniformly process into an appropriate map signature. Similarly, receiving the map request can include generating a plurality of map tile requests based on the received map request to break the map request into smaller more manageable parts that might have map signatures stored in the map cache and available for retrieval.

Yet other embodiments are directed toward a map server having a network interface configured to communicate with an external network, a processor coupled to the network interface and a cache memory coupled to the processor. The processor can be configured to execute computer readable code to receive a map request message from a map client over the network interface, generate a map signature based on the map request message and access the cache memory. The map server can determine if the cache memory includes the map signature. If the cache memory includes the map signature, then it can retrieve a map associated with the map signature from the cache memory. If the request map is not in the cache, the map server can generate a map based on the map request and send it to the requesting map client.

In other embodiments, the map server can be further configured to execute computer readable code to send the retrieved map associated with the map signature to the map client over the network interface generate a map based on the map request and send the generated map to a client. In embodiments in which the map server can generate a map based on the map request, the map server can also be configured to associate and store the generated map and the map signature to the cache memory. The map server can also be configured to send updates to and receive updates from a cache manager.

BRIEF DESCRIPTION OF THE DRAWINGS

FIG. 9 depicts sample map requests and map signatures according to various embodiments of the present invention.

DETAILED DESCRIPTION

Figure 1:
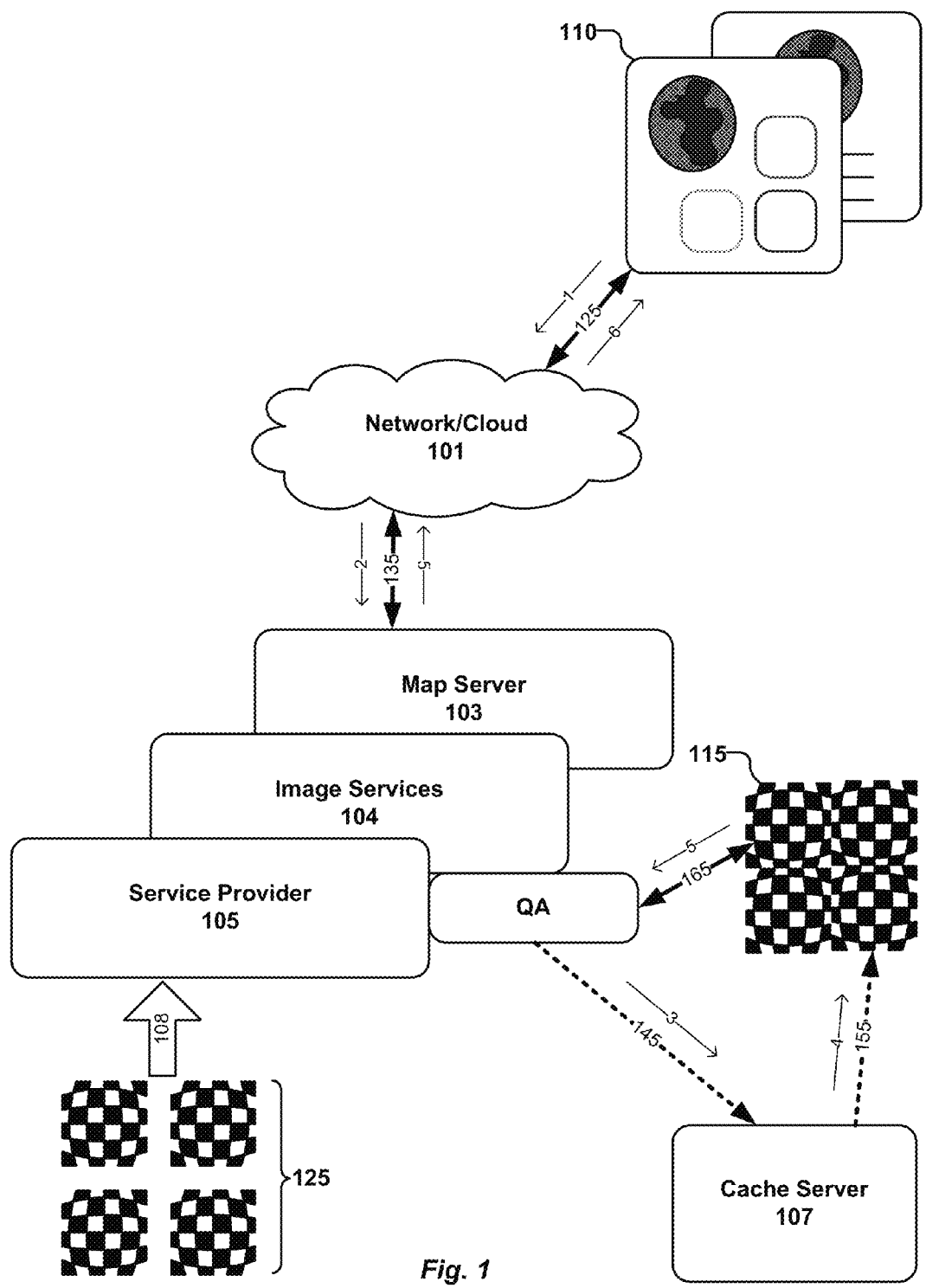
FIG. 1 is a schematic of non-query client based map system with signature-based map caching system according to various embodiments of the present invention.

Embodiments of the present invention are directed toward methods, systems, and computer servers for providing map and image services with signature-based map caching. Signature-based map caching can provide fast, efficient and highly scalable custom map services for map makers and map users alike. When requesting a map with a specific set of properties, traits, or characteristics, a client application can format the request into a standardized or otherwise suitable format for transmission to a map server providing signature-based map services. As used herein, the terms properties, traits, and characteristics can be used interchangeably to refer to the specifications of a particular map or map request.

The map request can be submitted to a map server by the client application based on the specifications of a user or an application at a client system. As used herein, a map server can comprise any remote or local computer, server, system or cache that has the capability to store, retrieve, generate, transmit or send maps or other imagery data. Depending on the format of the request message, the request message may need to be converted into a standardized map request by the map server. Once the map request is received or converted into the standardized format, a hash function can be applied to the map request to generate a signature or identifier (ID) based on the properties of the requested map specified in the map request. For example, the map request can include a specification for size, color, symbology style, language, coordinates, projection, and other map specific information. Based on the specified properties included in the map request, the hash function can create a unique map request/map signature or identifier for a map having the specified properties. In various embodiments, the map request/map signature can be generated by a map server, a map client, a map cache server or other entity and sent to or retrieved, received or otherwise obtained by another one of the map server, map client, map cache server or other entity.

The map server or map client can then check a signature-based map cache for the map signature. If the map signature exists in the cache, then the map server or map client can retrieve the previously rendered or generated map associated with the unique map signature. If received by the map sever then it can be sent to the requesting map client. If the map signature does not exist in the map cache, then the map server can submit the map request to a map server to generate the requested map. The generated map can then be sent to the map client. Once the map is generated, the map can be associated with a map signature based on the map request and stored in the map cache ready for the next time a map client requests a map associated with that particular map signature. The specific actions, operation, components, and functionality of various exemplary embodiments of signature-based map services are described in detail below.

Signature-based map caching can enable dynamic map services to perform effectively as tile-based map services when dynamic map requests are presented as map tiles. It is possible for map client applications that make requests that conform to any tiling schema to get immediate performance benefits without any modification in code according to various embodiments of the present invention. Additional performance gains can be achieved by clients that are optimized to use signature-based caching. Certain embodiments of the present invention enable existing map tiles that already exist as tiled caches to be used or imported directly into the signature-based map cache by simply generating map signatures based on the map properties and storing the associations. Whereas various embodiments focus on the use of signature-based caching for use in map imagery services, other embodiments can be applied to any form of map service. Similarly, additional embodiments can be applied to non-geographic and non-map based objects that need to be disseminated.

Various embodiments of the present invention can be implemented in a number of ways. System embodiments can include a number of styles and configuration of servers and clients. Each system can include and service any number of servers or clients suitable for implementing aspects of the present invention.

For example, map clients can be implemented in at least four ways to use the signature-based map caches according to various embodiments of the present invention. As used herein, the term "map client" can refer to a computer system running a map client application, the map client application itself or any other computing device used to send map requests to and receive map responses from a map server or map cache server. The three exemplary types of map clients include non-query (NQ), query only (QO), query and add (QA).

Non-query (NQ) type map clients can send map requests to a map server to retrieve the required map. Such NQ type map clients can function with no direct interaction with a map cache, signature-based or not. The NQ type map clients can depend on the map server for any and all map cache handling. If the map request includes a request for an available map tile, the map server can access the map cache and return the requested map from the map cache to the map client. If the requested map is not available in the map cache, the map server can process the map request, generate the requested map and then return the requested map, while also adding it to the cache.

Query only (Q) type map clients can create a unique map request or map signature for each map tile required based on a set of required or desired map properties. Using the unique map request or map signature, the map client can access the map cache to determine if the map tile is available in the map cache. If a map tile associated with the unique map signature exists in the map cache, then the map can be retrieved from the map cache. If the map signature does not exist in the map cache, the associated map request can be sent to and processed by an available map server, map image service or other map service provider. A query only type map client need not add data to the cache as the map server can add the data.

Query and add (QA) type map clients can generate a map request and corresponding map signature in a similar fashion as a query only map client. The QA type map client can then check the map cache to determine if the map signature in the corresponding requested map exists. If no cached map corresponding to the requested map tile exists, then the map request can be sent and processed by an appropriate map server to generate the requested map. The requested map can then be returned to the map client and can also be added to the map cache where it can be associated with its unique map signature. Embodiments that use of such QA type map clients and QA requests can include methods for adding the newly generated map to the map cache using the map server or the map client.

Each of the map clients described above can be incorporated as components in a number of different map systems with signature-based map cache architectures for delivering previously and dynamically rendered map tiles. Each type of map client has various advantages. Although each one of these exemplary types of map clients can be used with any number or any type of map systems with signature-based map caching, specific examples of the roles that each type of map clients can play are described below in relation to a number of exemplary map system architectures discussed below in reference to FIGS. 1-6.

FIG. 1 is a schematic diagram of a server-based map system with signature-based map caching according to one embodiment of the present invention. The server-based map system can include a basic implementation of a signature-based map caching system according to various embodiments of the present invention. As shown, the system of FIG. 1 can include a number of elements including, but not limited to map client 110 connected over connection 125 to a network/cloud 101, which in turn can be connected to a map server 103 over connection 135.

Each map server 103 can be implemented in hardware, software, or combination of the two. In some embodiments, each of map server 103, image services module 104 and service provider module 105 can be server computers or stand alone computers. As used herein, a server computer can refer to one or more networked computers having a processor and a memory capable of communicating with other computers or server computers over an electronic communication network. Accordingly, connections 125, 135, 145, 155, and 165 can be any suitable electronic communication medium for conducting fast and reliable data transactions. For example, connections 125, 135, 145, 155, and 165, and all of the connections described in reference to the following figures, can be implemented using ethernet, IP protocols or other open standard and proprietary network protocols.

In such server-based embodiments, the map client 110 can be a non-query" (NQ) type client. The NQ type map client can generate and send a map requests to the map server 103 or other map server. Each map request can include a number of user or map client specified map properties. map properties can include a description of the desired map defined by coordinate scheme, colors scheme, language, symbology scheme, scale, etc. The map server 103 can include the appropriate functionality for sending query-and-add (QA) map requests and therefore need only generate maps based on map requests that have not already been generated and saved to the map cache. Any previously made map requests can be cached and so the map server 103, does not have to reprocess a map request that was previously received and processed.

The data flow in the operation of the system shown in FIG. 1 is indicated by the numbered arrows along connections 125, 135, 145, 155, and 165. Map client 110 can include a user interface or other functionality to provide users with a way to specify a map. Map client 110 can then generate a map request based on the map specifications. In some embodiments, the map requests can include a combination of designated prerendered map tiles as well as map requests for specific custom or dynamic map tiles. However, in other embodiments, the map requests generated by the map client 110 can include a specifically formatted set of map properties, traits, characteristics, descriptors. The format of the map request property values can include single and mixed values including, but not limited to, integers, strings, hexadecimal, and decimals. The order, arrangement, or delimitation of the map property values can be organized to correspond to a specific structure so the component map properties of the map request can be efficiently parsed by a map server or other server computer.

Map client 110 can send map requests along connection 125 to a network/cloud 101 over connection 125. The network/cloud 101 can route the map requests to map server 103 over connection 135 in action 2. The map server 103 can generate QA type map requests that can include the contents of the map requests from map client 110. The QA type map requests can then be sent to the cache server 107 over connection 145 in action 3.

Cache server 107 can receive a QA type query and parse out the specifics of the included map request. When parsing the map request from the QA type map query, the cache server 107 can also reformat the map request if the map request is not already in a suitable format. Once the cache server 107 has the map request in a suitable format, the cache server 107 can apply a hash function to all or a portion of the map request. When the hash function is applied to the map request, the hash function can generate a unique map request/map identifier for the map request and the corresponding requested map. Any hash function suitable for performing a one-way or two-way transform on a map request or a map request message can be used. When the hash function is applied to a particular map request specifying a particular set of map properties unique to a specific map, a unique map request/map signature is generated that is different from the map signature based on another map request having a different set of map properties unique to another specific map. Thus a map request/map signature based on one map request, or at least some of the map properties included therein, will be different from a map request/map signature based on another map request. As used herein, the term map request identifier, map identifier, map request signature and map signature can be used interchangeably to refer to unique identifiers that can be associated with a specific map request for a specific map.

The cache server 107 can use unique map request/map identifiers to access the map cache 115 over connection 155 in action 4. When accessing the map cache 115, cache server 107 can determine whether or not a prerendered map or map tile is stored in map cache 115 and/or associated with a matching map request/map identifier. If it is determined that map cache 115 contains or otherwise includes a map or map tile associated with the unique map request/map identifier, then map cache 115 can return the associated map/map tile over connection 165 in action 5.

If however, cache server 107 determines that map cache 115 does not contain or otherwise include a map or map tile associated with the unique map request/map identifier, then it can return an appropriate response and the map server 103 will need to generate or render the map specified in the map request. To do so, the map server 103 can draw upon a collection of data stores of map data 125 over connection 108. Once the map server 103 generates or renders the map or map tile specified by the map request, the rendered map or map tile can be associated with the unique map request/map identifier. The association between the rendered map or map tile and the unique map request/map identifier and the rendered map or map tile can be stored to map cache 115. In this way, cache server 107 can identify and retrieve the map or map tile associated with the unique map request/map identifier the next time client 110 or any other client submits an identical map request. In such embodiments, the ability to use the map request/map identifier to quickly identify and retrieve map and map tiles previously generated based on previously received custom map requests can increase the speed and efficiency with which maps are provided to users.

Figure 2:
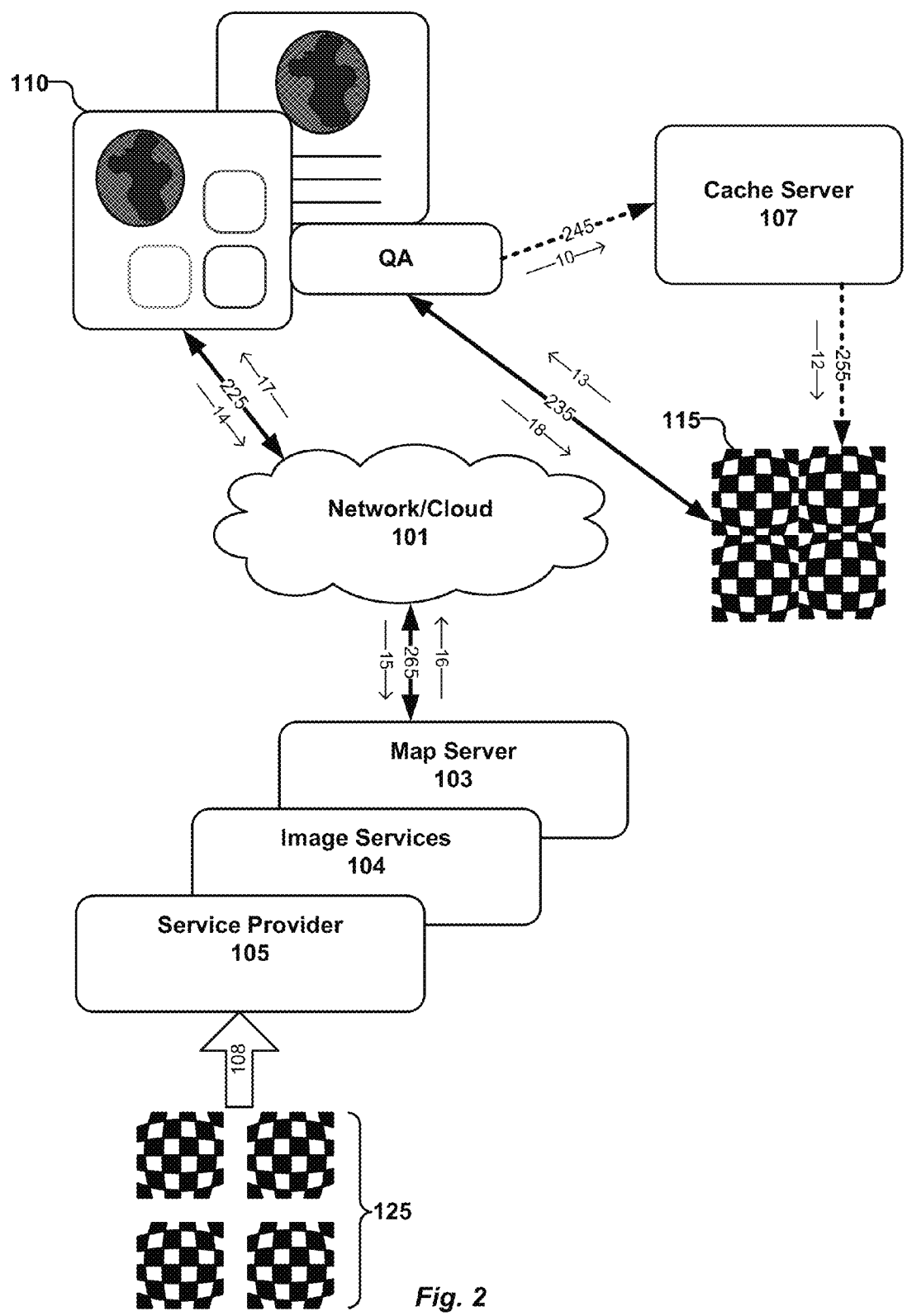
FIG. 2 is a schematic of query and add client based map system with signature-based map caching according to various embodiments of the present invention.

FIG. 2 shows a system architecture of a standalone-client-based map system according to various embodiments of the present invention. As shown in FIG. 2, such embodiments include elements similar to those described in reference to the system architecture in FIG. 1. In the standalone-client embodiments, client 110 can be run with or have access to its own cache server 107 and/or map cache 115. Map client 110 can generate its own QA map request based on a particular map request. Map client 110 can send a QA map request to cache server 107 over connection 245 in action 10. As before, cache server 107 can parse out the specifics of the map request from the QA type map request and possibly reformat the map request before applying a hash function to determine a unique map request/map identifier. Once the unique map request/map identifier is determined, cache server 107 can access cache 115 over connection 225 in action 12. If the unique map request/map identifier exists in cache 115, then the associated map/map tile can be returned to the map client 110 over connection 235 at action 13. In other embodiments, map client 110 can generate the unique map request/map identifier and access the cache 115 to determine if the unique map request/map identifier exists in the cache 115. If, the unique map request/map identifier is not found in cache 115, then client 110 can send the map request over connection 225 to the network/cloud 101 in action 14. From there the map request can be routed to map server 103 over connection 265 in action 15.

Map server 103 can process the map request and use it to generate the map or map tile specified in the map request as described above in reference to FIG. 1. Once the map or map tile specified in the map request is generated, the generated map or map tile can be returned via the network/cloud 101 to the map client 110 in actions 16 and 17. When the map client 110 receives the generated map or map tile specified in the map request, it can then send the generated map to cache server 107 so that it can be stored and associated with the unique map request/map identifier for future reference and retrieval in action 18. In some embodiments, map client 110 can update cache server 107 with information regarding the stored map or map tile and the associated unique map request/map identifier. In other embodiments, the cache server 107 handles updating the cache 115.

Figure 3:
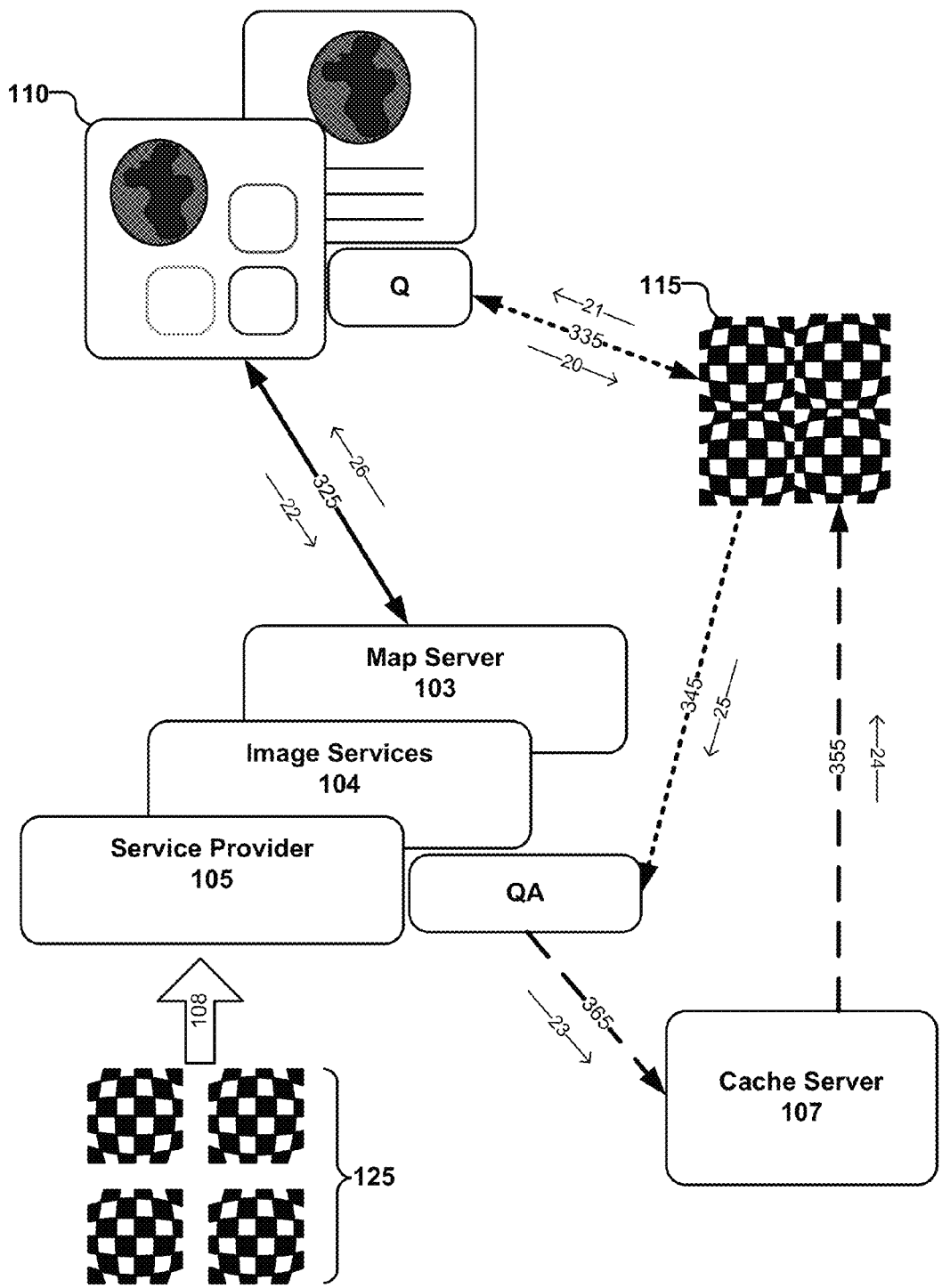
FIG. 3 is schematic of a query only and web-browser style client based map system with signature-based map caching according to various embodiments of the present invention.

FIG. 3 shows a map system architecture with a query only type map client configuration according to various embodiments of the present invention. In such embodiments, the map client 110 is a query only (QO) type map client and the map server 103 is a QA type server. In such embodiments, the map client 110 can generate a unique map request/map identifier and directly query map cache 115 to determine if map cache 115 contains or otherwise includes a map or map tile that corresponds to the unique map request/map identifier in action 20. If the map or map tile associated with the unique map request/map identifier exists in map cache 115, map client 110 can then retrieve the associated map or map tile over connection 335 in action 21. As in other embodiments, if the map request/map identifier does not exist in map cache 115, the map client 110 can send a map request to map server 103 over connection 325 in action 22.

Once a map or map tile is generated based on the map request received from the map client 110, the map server 103 can send the generated map or map tile to cache server 107 over connection 365 in action 23. Cache server 107 can then store the generated map or map tile and associate it with the corresponding unique map request/map identifier in the map cache 115 for later reference over connection 355 in action 24. Map cache 115 can confirm to the map server 103 that the generated map or map tile has been stored along with its associated map request/map identifier over connection 345 in action 25.

In some embodiments, the map server 103 can send the generated map or map tile to map client 110 based on the map request submitted over connection 325 in action 26. In other embodiments, action 26 can also include reporting back to map client 110 that the requested map or map tile has been generated and stored in map cache 115 along with the associated unique map request/map identifier.

Figure 4:
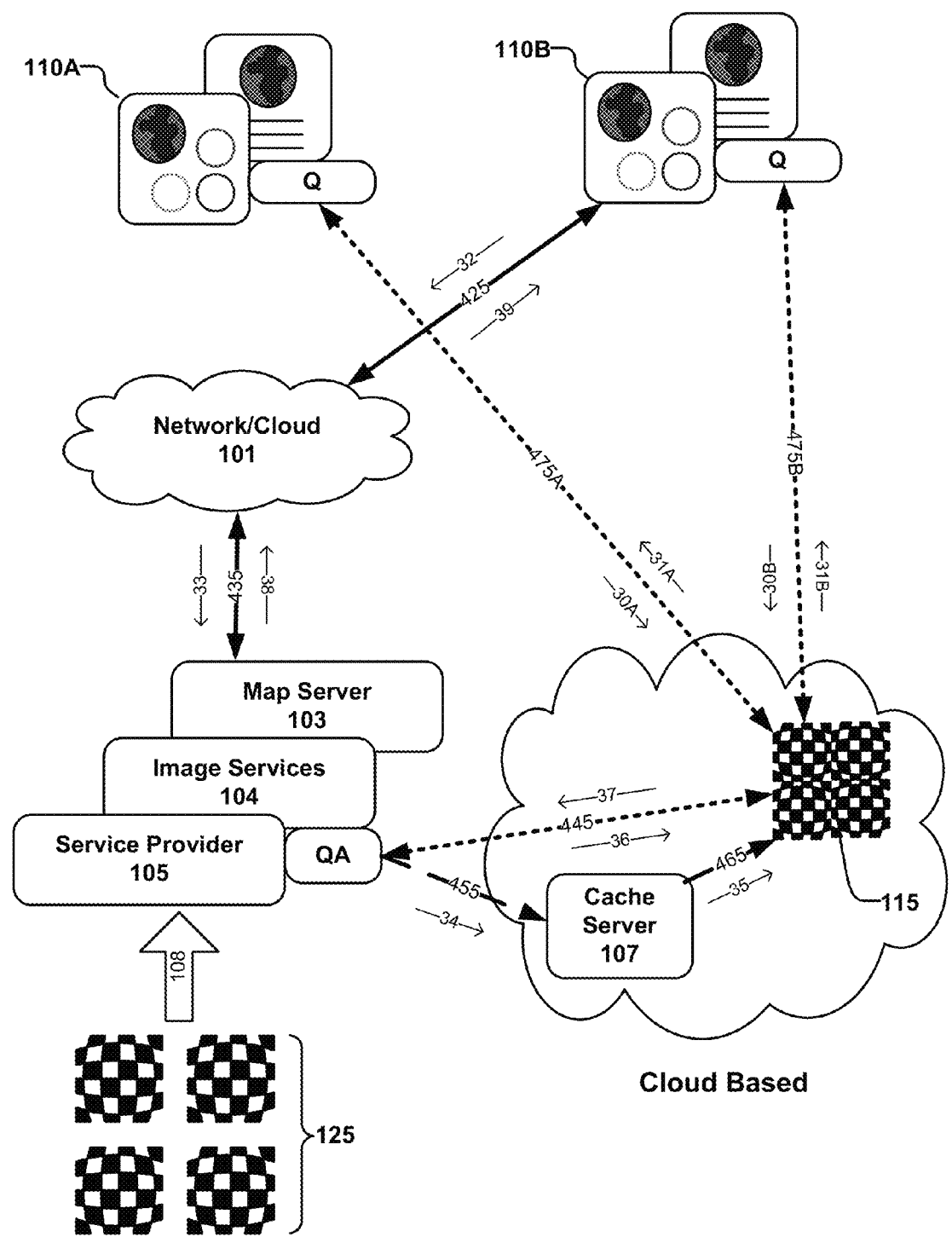
FIG. 4 is a schematic of a distributed map system with signature-based map caching according to various embodiments of the present invention.

FIG. 4 shows an embodiment of the present invention utilizing a cloud configuration for providing a map system with a signature-based map cache. The cloud configuration is similar to the direct query client configuration shown in FIG. 3; except for the cache server 107 and map cache 115 exist and/or are hosted in a distributed computing cloud based environment. As shown, map clients 110A and 110B can be directly connected to map cache 115 within the cloud using the connections 475A and 475B. Based on the properties in a particular map request, map clients 110A and 110B can generate a map request/map signature by applying a hash function to the map request. Each client can then directly submit a QO-type map request that can include the unique map request/map identifier in actions 30A and 30B. If the unique map request/map identifier exists in the map cache 115, then the corresponding stored map having the properties specified in the map request can be returned to the map clients in actions 31A and 31B.

However, if the unique map request/map identifier does not exist in the map cache 115, then the map cache 115 can return a response to the QO-type map request indicating to the map client that no such map request/map identifier exists in the cache. In such instances, the map client, such as map client 110B, can send the map request over the network/cloud 101 to map server 103 over connections 425 and 435 in actions 32 and 33. Map server 103 can generate the requested map or map tile specified in the map request.

Once the requested map or map tile is generated, map server 103 can generate the unique map request/map identifier based on the map request and send a query and add request to cache server 107 over connection 455 in action 34. The cache server 107 can then verify the unique map request/map identifier does not exist in the cache 115 over connection 465 in action 35. If the cache server 107 verifies that the unique map request/map identifier does not exist in the cache 115, then map server 103, image services module 104 or service provider 105 can add the generated map or map tile to the cache 115 along with its associated unique map request/map identifier over connection 445 in action 36. In some embodiments, the map cache 115 can verify that the map or map tile and its associated unique map request/map identifier have been stored in the cache over connection 445 in action 37.

In addition, map server 103 can also return the generated map or map tile through the network/cloud 101 to the requesting map client 110B over connections 435 and 425 in actions 38 and 39. Once the generated map or map tile is generated, map server 103 can return the generated map or map tile to the requesting map client and submit it to the cache server 107 and map cache 115 in parallel or in series depending on the available processing and network resources.

Figure 5:
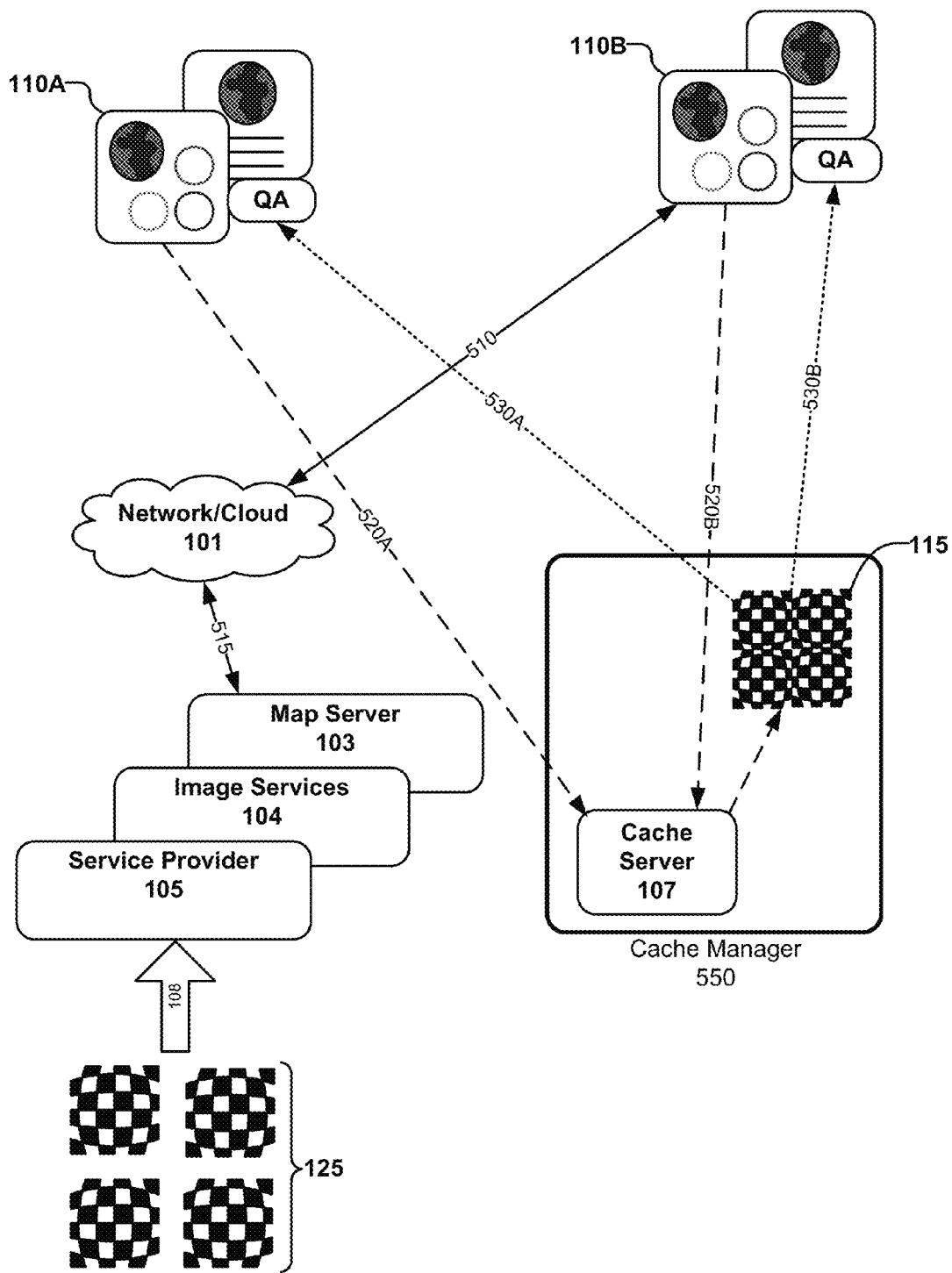
FIG. 5 is a schematic of a workgroup map system with signature-based map caching according to various embodiments of the present invention.

FIG. 5 shows a work group client based map system architecture for implementing various embodiments of the present invention. In such embodiments, multiple QA type map clients can access the map cache in a workgroup environment. The multiple map clients within a workgroup can connect to the same cache manager 550. As shown, each map client 110A and 110B can generate a specific map or map tile request, and convert that map or map tile request into a unique map request/map identifier. The map clients can then send a query and add map request that includes the map request/map identifier to the cache server 107 within cache manager 550 over connections 520A and 520B. As in other embodiments, the cache server 107 can then access the map cache 115 under the control of the cache manager 550 over connection 525 to determine whether the map cache 115 includes a map or map tile associated with the unique map request/map identifier. If the map cache 115 includes a map or map tile associated with unique map request/map identifier, it can return the corresponding map or map tile directly back to the requesting client over connections 530A and 530B.

However, if the map cache 115 does not include the unique map request/map identifier, then a map client, such as map client 110B can send the map request to a server to have the requested map or map tile generated a returned to the map client. In some embodiments, map server 103 can then update the cache server 107 and the map cache 115 to include the generated map or map tile and the associated unique map request/map identifier.

The workgroup client configuration shown in FIG. 5 is advantageous for users working in teams and drawing information from the same internal or external server. Each new map or map tile need only be generated the first time that one of the users in the team is interested in that particular map or map tile. Once the particular map or map tile is generated, it can be stored in the cache server 107 and rapidly accessed by other users in the team. The cache server requires very little CPU and can be implemented in low-cost devices.

In some embodiments, a cache manager 550 can be an application run on a server computer or a portion of a server computer to manage and update the map cache 115. For a map client, server or application to add a map tile and an associated map request/map identifier to the map cache it can either add it directly, or send a request to the cache manager 550. The cache manager 550 can maintain a list of the maps or map tiles added and can provide management functions to delete or update map or map tiles as required.

As the cache manager 550 is not required to read maps or map tiles, the system performance is highly scalable.

Map clients can attempt to retrieve a map tile associated with a map signature directly from the map cache by trying to access a map tile path that includes the map signature or using a tile handler based system. Tile handlers are used to quickly extract tiles from a large store of indexed tiles. In some embodiments, if the attempt to access the map tile at the map tile path that includes the map signature or accessing the tile handler fails, then the map client can determine that that particular map tile does not exist in the cache. Such attempt-based embodiments represent some of the most basic implementations. However, in more sophisticated implementations, the map clients can be allowed to actually submit the results of such attempts to the cache for maintenance and or creation of map tiles in the map cache. In such embodiments, the map cache can require management. Instead of map client directly attempting to write or update a map tile, the cache manager 550 can be configured to manage all update and write functions to the map cache. As described above in reference to FIG. 5, the cache manager can include a cache server 107 and at least one map cache 115. In some embodiments, the cache manager can be a software application executed by a processor in the cache server 107 or in external server. In other embodiments, the cache server 107 can act as the cache manager 550. In other embodiments, the cache manager 550 is implemented in hardware, such as a specially made ASIC.

To add a map tile, the cache manager 550 can be provided with the map tile, the map properties, and the associated map signature. The cache manager can add the map tile to the required directory as well as store information about the map tile in a 'Tile List' to enable management. The cache manager 550 can run as light weight or thin application that exposes only the AddTile function. Such embodiments can be implemented as simple SOAP or REST based requests that need no return values or a returned success or fail value only. Examples of the parameters of the AddTile function can include, but are not limited to, ID (map tile signature), Version, MinX, MinY, MaxX, MaxY, Rows, Cols, SRS, Other Properties (XML String of the none default values) and Tile (the actual map tile to be stored as a binary blob). These properties can be stored either as a simple list or indexed in a database.

The ability to call the AddTile functionality can be added to all QA type clients. In some embodiments, the map signature can also be included in the AddTile request. While in other embodiments, the cache manager 550 can be configured to compute the map signature. The AddTile functionality can be included in the map clients to assure the tiles that are accessed from the server are also included in a suitable cache. In some embodiments, map clients can be configured to modify map signatures to create private map tiles.

The cache manager 550 can also include data management functions that can be used to enable map caches to be updated or deleted. Cache management can include features and functionality to delete and replace map tiles so that map tiles can be kept updated should the base maps get updated. Such updated can be driven based on polygons overlays or generated as dirty area polygons when map services are updated. Such map cache management functions can be called by a specialized cache management tool application. Cache management tools can utilize the information stored in the Tile List to delete or update tiles in the cache depending on changes made to the base maps.

Figure 6:
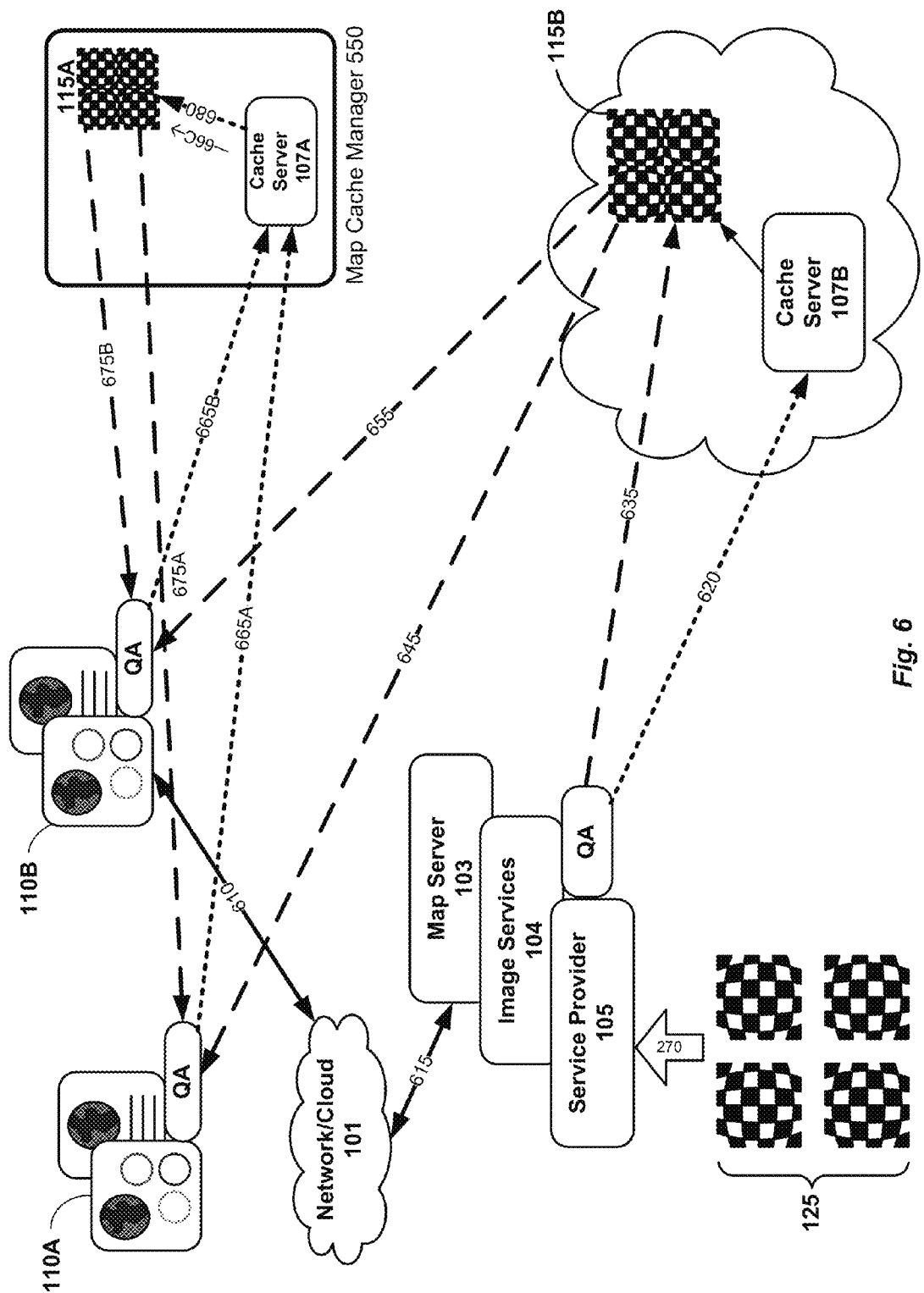
FIG. 6 is a schematic of a mixed map system with signature-based map caching according to various embodiments of the present invention.

FIG. 6 shows a map system architecture according to various embodiments that provides for a mix of elements and map client types discussed in reference to FIGS. 1-5. In such embodiments, query and add type map clients 110A and 110B can be simultaneously connected to a cache server 107A and map cache 115A in the map cache manager 550 over connections 665A, 665B, 675A and 675B and to cache server 107B and map cache 115B in a cloud via network/cloud 101, map server 103 over connections 610, 615, 620 and 635. The system of FIG. 6 provides the functionality of submitting map requests, unique map request/map identifiers and receiving responses in the form of generated maps or map tiles from map server 103 or from one of the map caches similar to that described above in reference to FIGS. 1-5.

One advantage of the mixed system architecture shown in FIG. 6 is that it can be constructed without regard for the contents and functionality of the constituent clients and servers. The mixture of the cloud and the workgroup system architectures reduces the number requests on the servers while also reducing the bandwidth requirements from the workgroup. In some such embodiments, the map client can be setup to look for maps or map tiles first in the map cache manager 550. If the requested map does not exist in the map cache manager 550, the map client can send a request to the map cache 115B in the cloud. In the event the requested map or map tile does not exist in either one of the map caches, the map server 103 can produce, generate, or otherwise provide the requested map as previously described.

Figure 7:
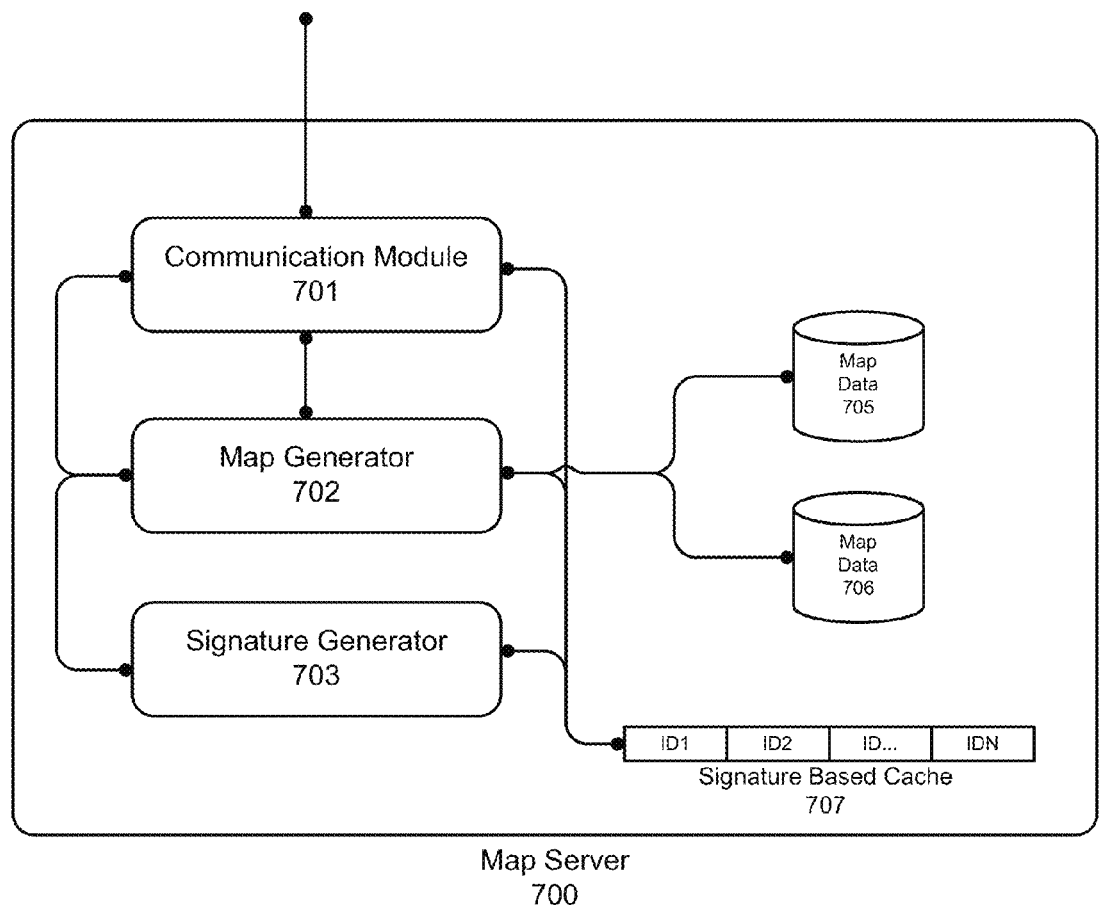
FIG. 7 is a schematic of a cache server according to various embodiments of the present invention.

FIG. 7 is a schematic of a map server 700 according to various embodiments of the present invention. As shown, map server 700 can include a communication module 701 connected to a map generator 702 and a signature generator 703. In addition, map server 700 can also include a number of map databases such as map data 705 and map data 706. Finally map server 700 can also include a signature-based cache 707. In some embodiments, all of the components shown in map server 700 are included in the same server, however in other embodiments, any subset of the components shown in map server 700 can be included or controlled by a separate server external to map server 700.

Communication module 701 can be implemented in hardware, software, or combination thereof. The functionality of communication module 701 can vary depending on the communication requirements and environments in which map server 700 will be implemented. For example, communication module 701 can communicate over various types of communication protocols, including, but not limited to, IP protocols, Ethernet, and other proprietary and open standard communication protocols. As such, communication module 701 can receive the map requests and map request/map identifiers from various map clients and sources. Communication module 701 can relay the map request/map identifiers and map requests to either the map generator 702 or the signature generator 703. In some embodiments, if the communication module 701 receives a map request only, that map request will be sent to map generator 702 for processing.

Map generator 702 can be implemented in hardware, software, or a combination thereof and configured to draw upon map data in map data 705 or map data 706 to generate the map or map tile specified in the map request. The map generator 702 can then return the generated map or map tile to the requesting map clients via communication module 701. In other embodiments, the map generator 702 can send the map request to the signature generator 703 and the generated map to signature-based cache 707.

Signature generator 703 can use the map request received from the map generator 702 to generate a unique map request/map identifier or signature. Unique map request/map identifier or signature can then be stored in signature-based cache 707 in association with the map generated based on the map request. The association between the unique map request/map identifier and the generated map or map tile can later be used to recall the generated map or map tile.

In other embodiments, in which the communication module 701 receives a pre-generated map request/map identifier from a map client, it can access the signature-based cache 707 to determine if a map or map tile associated with the map request/map identifier exists. If the signature-based cache 707 includes the map request/map identifier, then the communication module 701 can retrieve the associated map or map tile and return it to the requesting map client.

In similar embodiments, in which the communication module 701 receives a map request but not a unique map request/map identifier, it can send the map request to the signature generator 703 to generate the map request/map identifier or signature. Signature generator 703 can be implemented in hardware, software, or combination thereof. In some embodiments, in which the communication module 701 receives only a map request from a client, signature generator 703 can generate a unique map request/map identifier based on the map request, access the signature-based cache 707 and determine if the unique map request/map identifier exists in the signature-based cache 707 before the map generator 702 is activated to generate the requested map. In such embodiments, the load on the map generator 702, and map server 700 in general, is greatly reduced if the requested map is already generated and can be retrieved and delivered using the map request/map identifier. The reduced load on the map server 700 and its constituent components, and the speed with which map server 700 can service multiple map clients can be greatly increased.

Figure 8:
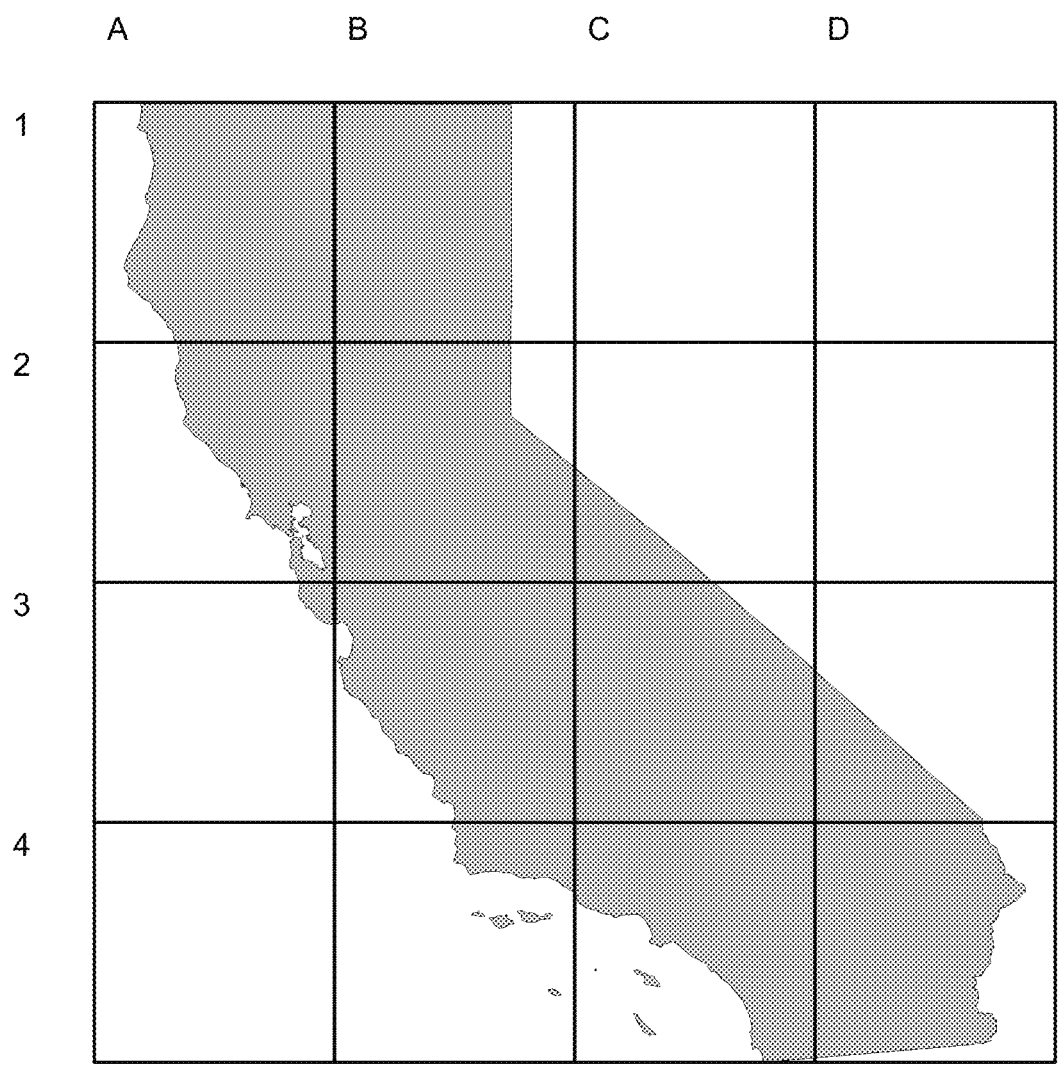
FIG. 8 is a map mosaic that includes a number of map tiles that can be used in various embodiments of the present invention.

FIG. 8 is an example of a map mosaic of the state of California in the United States of America comprising multiple map tiles. As used herein, map tiles refer to any subpart of any composite map generated by a map server or stored in a map cache. As described above, a user can use a map client to request any number of map tiles. In traditional map systems, each one of the pre-rendered components map tiles, A1 through D4, can be retrieved using the two dimensional address such as B2 or C4.

However, traditional tile-based map systems can only provide the map tiles the prerendered and associated with a particular map tile address. Some traditional tile-based map systems have been improved by allowing map clients to choose from a number of prerendered sets maps or map tiles of the same map area. For example, one set of prerendered map tiles for the map of California shown in FIG. 8 can include topography and terrain data while another set of prerendered map tiles can include the names or number designations of roads, highways, and freeways. Other map-tile-based systems have been implemented to allow map clients to request that various data from one set of map tiles be overlaid or otherwise fused with the map data from another set of map tiles. For example, a user using a map client can specify that tile A1 from a set 1 that includes road names in English be overlaid on top of tile A1 from a set 2 that includes terrain details in metric units. However, assuming that only sets 1 and 2 are available to the map client, then the user can not further customize the map tile A1 to include road names or other symbology in another language, such as Spanish, nor can the user specify that the terrain details be given in English imperial units.

To fully customize a map, a user would have to submit a map request to dynamic map server to generate the specifics of each map or map tile. In many situations, generating each map on-the-fly can cause a great burden on the map server and ultimately slow down or impede the efficient delivery of customized maps to map clients. Various embodiments of the present invention are directed towards improving or solving the speed and efficiency with which custom maps can be delivered to map clients and users.

FIG. 9 shows two exemplary map requests. Map request 910 shows a typical map request for traditional tile-based map system. The map request 910 $R(x,n)=[(A, 1):(B, 2)]=X_{910}$ indicates a request for a pre-rendered map tiles in the range between (A, 1) and (B, 2). Such requests can be submitted typically after the map client has indicated which set of map tiles from which it would like to retrieve map tiles. Map request 920 is another typical map request used in dynamic map systems. As shown, a map request 920 includes a number of traits, i.e. a language, scale, color and boundaries. In the example shown, the map request includes a request for a map in English, with the scale of 0.6, a color scheme 2 for the coordinates between (1, A) and (2, B). Such a map request can be used by a map generator to retrieve the requisite data from one or more map databases and then render the requested map or map tiles based on the specification.

In some embodiments, before the map request is processed using a map generator to generate the requested map, the map request can be converted into a unique map identifier or signature. Unique map identifier 930 illustrates how a hash algorithm, such as MD5, can be used to generate the unique map request/map identifier or signature $X_{920}$. As shown, the unique map request/map identifier or signature can be based not on the position of a tile in a predefined tiling schema, but based on all the properties of the requested map or map tile. These properties on which a unique map request/map identifier can be based on include, but not limited to, a spatial reference system of the request, extents (MinX,MinY,MaxX,MaxY), columns and rows, format of the returned map or image, compression method and quality, background color, render rules and other additional process change parameters. The map properties can be defined as an ASCII string and then passed through the MD5 hash function that returns a 128bit unique signature defined using 32hex digits. A typical signature would be 1297fa57dba77334b1b2a9182607babc. Accordingly, if any one of the properties specified in the map request changes, then the map signature can also change.

Maps and map tiles in cache can be stored to a memory such as hard disk or other non-transitory or transitory computer readable medium. To ensure maximum scalability of systems implementing various embodiments of the present invention, requests for maps and map tiles can be implemented as a simple http get (or disk read) request that does not involve a database or require multiple transactions between multiple processors and memories. As such, the maps or map tiles can appear as files in a file system. Alternatively the tiles can be stored in specialized file structures optimized to handle very large numbers of tiles and accessed through tile handlers that extract the associated tiles based on signatures.

Map clients that perform tile-based requests can inherently make the same tile requests when in the same environment. For example, a map client can be used to zoom in on a particular area of interest. The map client can then pan, scan and zoom in and move around the area of interest and in doing so, the map client can make repeated map requests for the particular map tiles to change and refresh the displayed area of interest. In some embodiments, the map client can use predictive methods to determine which map tiles to request as a user employs the map client to manipulate the displayed map. Such predictive methods can include information regarding the direction, velocity, and acceleration with which the map client manipulates the displayed map.

In some embodiments, the areas of interest in a map are common to multiple users and map clients or a user can return in a separate application session to the same area. To increase the efficiency with which the map clients access commonly accessed map tiles, map clients can be configured to make requests that conform to specific map tiling standards and schemes that reference the commonly requested map tiles. To further increase the speed and efficiency, various embodiments are directed toward increasing the likelihood that multiple client applications make identical map requests using identical map request/map signatures so that the requested map can be returned from the map cache instead of being newly generated by a map generator. To increase the likelihood that multiple map clients make map requests using identical map signatures, the map clients can be configured with information on the default map request settings. These defaults can suggest tiling schemas to use as well as map properties that should be set in map requests that will result in map requests/map signatures corresponding to maps and map tiles that already been generated and stored in a map cache.

In such embodiments, map clients can generate map requests based on predetermined lists of properties found in the default map request settings. As a result, the map request/map signatures can be different if the properties specified in the map request are defined or left as defaults. If one map client defines a property in the map request the same as the default value and another map client does not set that particular property then the signatures can be different although the requested map specifies the same map properties. In other embodiments, the resulting map signatures can be identical if the map request with the explicitly defined map request properties is the same as the map request with the default map properties. In such embodiments, map clients might only specify additional properties if they are different to the defaults properties. This can ensure that clients that do not change properties will create map requests and reference the same map signature that are the same as clients that set map properties.

To help ensure that the map requests and the resulting map signatures are consistent from map client to map client, various embodiments utilize various check sums or hints on how to better make conforming tile requests are included in the configuration information provided to the map clients. By configuring the configuration information appropriately, existing pre-generated map caches can be used and/or incorporated with various embodiments of the present invention.

For example, existing tile-based map caches can be utilized. To do so requires that link files that conform to the tile signature scheme be created for each existing map tile. Such link files are small in size and are very fast to generate. If link files are created, then the management of existing caches can be handled using the data management capabilities of the cache manager. Alternatively, code in tile handlers can generate the association on demand. Map clients that currently make requests by providing a tile ID to a web service can also be served with on-demand map requests. The requested tile identifier would be converted to a signature, checked, and the map dynamically generated if the time identifier does not exist.

One advantage of various embodiments of the present invention is the reduction of unnecessary cached map requests. To further increase the effectiveness of various embodiments, a map client can make map requests that are both tile-based and dynamic using the similar protocols. To do so, a server, the map server 103 that receives a dynamic request can determine if the request specified a possible map tile. Additionally only maps tiles that are likely to be used again can be cached. To encourage request for map tiles that will be used again by other users and map clients, embodiments of the present invention can be configured to limit or guide requests.

For example, a query only client can be configured to make a request for a tile only if the number of rows and columns of the request are equal (i.e. square), and the requested columns are typical for tiles (for example 16, 32, 64, 96, 128, 256, 512, 1024). As a result, requests from clients that make dynamic requests can generally not be cached. Similarly, a Query and Add client can be provided with a set of filters that define which requests to add to the cache.

The list of filters can include, but is not limited to specific projections, formats, and compression or render rules.

Map Request/Map Signatures

To ensure that all map clients create the same map signature for the same map or map tile, a standardized method of signature generation can be defined. Map tile signatures can be created by using a MD5 hash function to generate a 128bit map signature when based on a map property or map request string.

A map tile signature can include indications of various map properties. The map properties can include properties that change for each request, such as map extents, and properties that remain generally constant for each request, such as mosaic method. The signature generation can be split into parts, such as, creating the state signature, creating the extent identifier, and/or creating the map tile signature.

The state signature can be created by concatenating state parameters, i.e. string values that do not change depending extent. The state parameters can specify properties such as render rules, compression methods, etc. As defined above it is advantageous if only the parameters that differ from the default values defined by the service are used.

The extent identifier is dependent on the extent of the map request. The extent identifier can be the standardized tile location (defined as level, column and row in a tiling schema) or generated based on the extents and rows/columns for the request. Since the extents of a map are floating point values they can be very sensitive to change and there can be a high probability that the extent values are not exact and the resulting signature would change. To ensure has hash functions do not changed due to small fluctuations in float values, the algorithm performs a rounding of the values to about ½ pixel.

In some embodiments, the following pseudo code can be the bases for creating the extent identifier:

Input

MinX,MinY,MaxX,MaxY,Cols,Rows

Min,Max values are floats that define the extents of the request and Cols,Rows are long integers that represent the number of Columns and Rows of the request.

The pixel size (PS) can be defined as (MaxX−MinX)/Cols or (MaxY−MinY)/Rows

A coordinate (X or Y) can be rounded to the using:
PS*round(X/PS)
The issue is that PS can be a large range i.e. 134534.2343 or very small i.e. 0.000000234232
Solution:
For X coordinates and Cols
PS=(MaxY−MinY)/Rows
Mult=10^(2−FLOOR(LOG(PS,10)))
CPS=round(1.5*(PS*Mult)/2)/Mult
UPSX=round(sqrt(PS*Mult))
NMinX=round((MinX/CPS))
NMaxX=round((MaxX/CPS))
NMinX and NMaxX are integers.
The rounded MinX coord would be NMinX*CPS
UPSX is a number that is dependant on the pixel size. It is included to ensures that the signature is unique for all PS that are >=a factor of 2 different. If not, then there could be cases where the NMinX,NMinY values could be the same for different pixel size values. If a higher resolution in PS is required the computation can be scaled before the rounding.
This is repeated for the Y coordinates and Rows
The ExtenID is returned as the concatenation of the following strings
NMinX,NMaxX,UPSX,NMinY,NMaxY,UPSY,Cols, Rows
This string can be passed through the hash function to create an extent signature.
The map tile signature used as the identifier of the tile can be based on a combination of both the state and extent signatures, alternatively the state signature can be used to as an index to a set of tiles that are then referenced using more common level, column and row based naming conventions.

Security Considerations

One general issue with implementing traditional tile based services is that it is difficult to implement security over a wide range of infrastructures and architectures. If the location of the cache and tile naming is known it is easy to access map tiles. Security can be implemented using protocols such as https, but this has practical restrictions. Another method is to encrypt the map tiles such that map client must first decrypt the map tiles, but this can significantly slow down display and increase complexity. One embodiment of the present invention is can provide a third option in which the map client includes some additional properties in the map request prior to the creation of the map signature. Such a method can create a map tile with a map signature that is only creatable by entities that that can include the same property. A map client without the correct additional property cannot access the map signatures required to access the tiles. In such embodiments, access to the map tiles list can be easily restricted.

Advantages of embodiments of the present invention over a single pre-defined grid of tiles include: higher speed customization of map with reduced complexity of use and maintenance of map cache and map data stores, increased flexibility to use multiple tiling structures, increased flexibility to work with any map client, increased flexibility in term of the ability to make calls to the cache server using the map client, web service or a service provider and increase in the ability to directly manage the map cache and use existing tile-based schemas since existing caches can be easily added to such a tile server without the need for regeneration.

Figure 10:
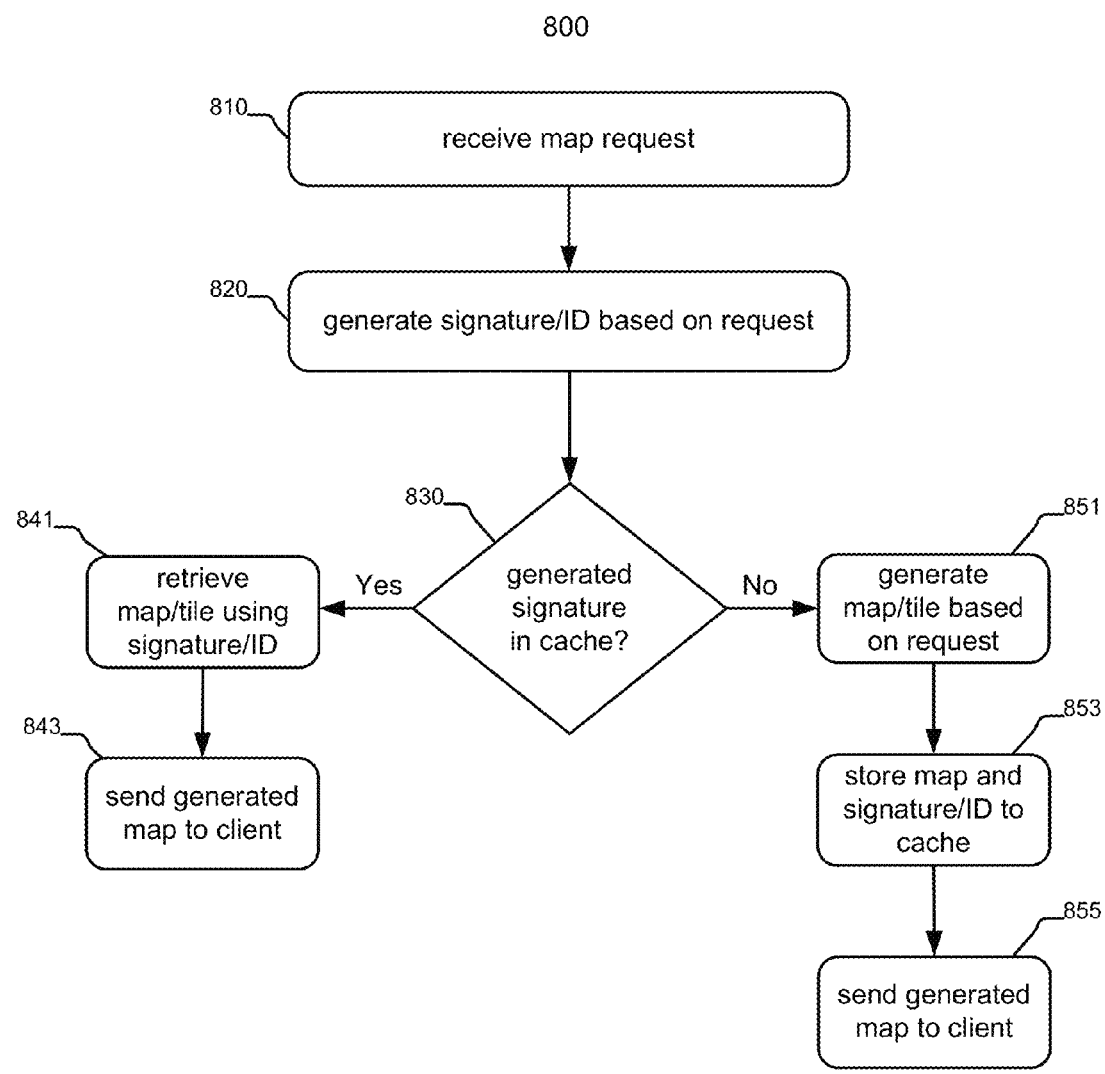
FIG. 10 is a flowchart of a method for providing map tiles according to embodiments of the present invention.

FIG. 10 is a flowchart of a method 800 for operating a map system with signature-based map caching according to one embodiment of the present invention. The method begins at action 810 in which a map server or other computing device receives a map request from a map client. At action 820, the map server can generate a map request/map signature or identifier based on the properties specified in the received map request. The map server can then check a map cache to determine whether the generated map request/map signature exists in action 830.

If the generated map request/map signature exists in the map cache, then the map server retrieves the map or map tile associated with the map request/map signature from cache in action 841. The map or map tile associated with map request/map signature can then be sent to a map client in action 843.

If the generated map request/map signature does not exist in the map cache, then the map server can generate a map or map-tile-based on the map request in action 851. Once the map or map tiles are generated, the map server can then store the map and the associated map request/map signature to the map cache in action 853. The map server can send the generated map to the requesting map client in action 855. This method can be repeated for as many maps or map tiles the requested by one or more map clients.

Figure 11:
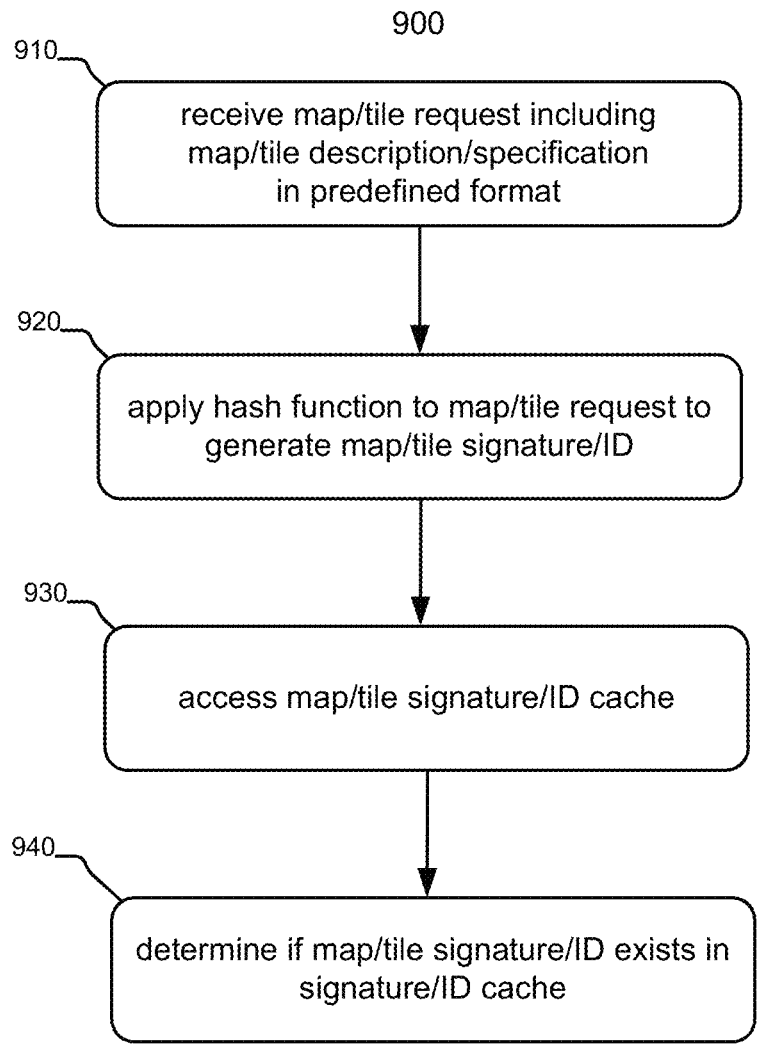
FIG. 11 is a flowchart of a method for providing map request/map signatures according to embodiments of the present invention.

FIG. 11 is a flowchart of a method 900 for generating a map request/map signature according to various embodiments of the present invention. This method can be carried out by any number of components within a map system including, but not limited to, a map server, the cache manager, a map client, or any other component or elements discussed above in reference to other embodiments of the present invention.

For purposes of illustration, the method 900 will be described from the perspective of a map server. The map server can receive a map/map tile request including map/map tile description or specification a predetermined map request format. In some embodiments, the map request in the predetermined map request format must be converted from a noncompliant map request format as defined by another element or component of the map system. In such embodiments, the map server can include a table or other data store to reference in order to make conversion. In action 920, the map server can apply a hash function to the map or map tile request to generate the map request/map signature. In some embodiments of the present invention, an MD5 hash function can be applied, while in other embodiments, other hash functions can be utilized.

In action 930, the map server can access a map request/ map signature map cache. Based on whether a record corresponding to the generated map request/map signature exists within the map cache, the map server can determine whether the corresponding map or map tile as specified in the originally received map or map tile request is stored in the map cache.

Figure 12:
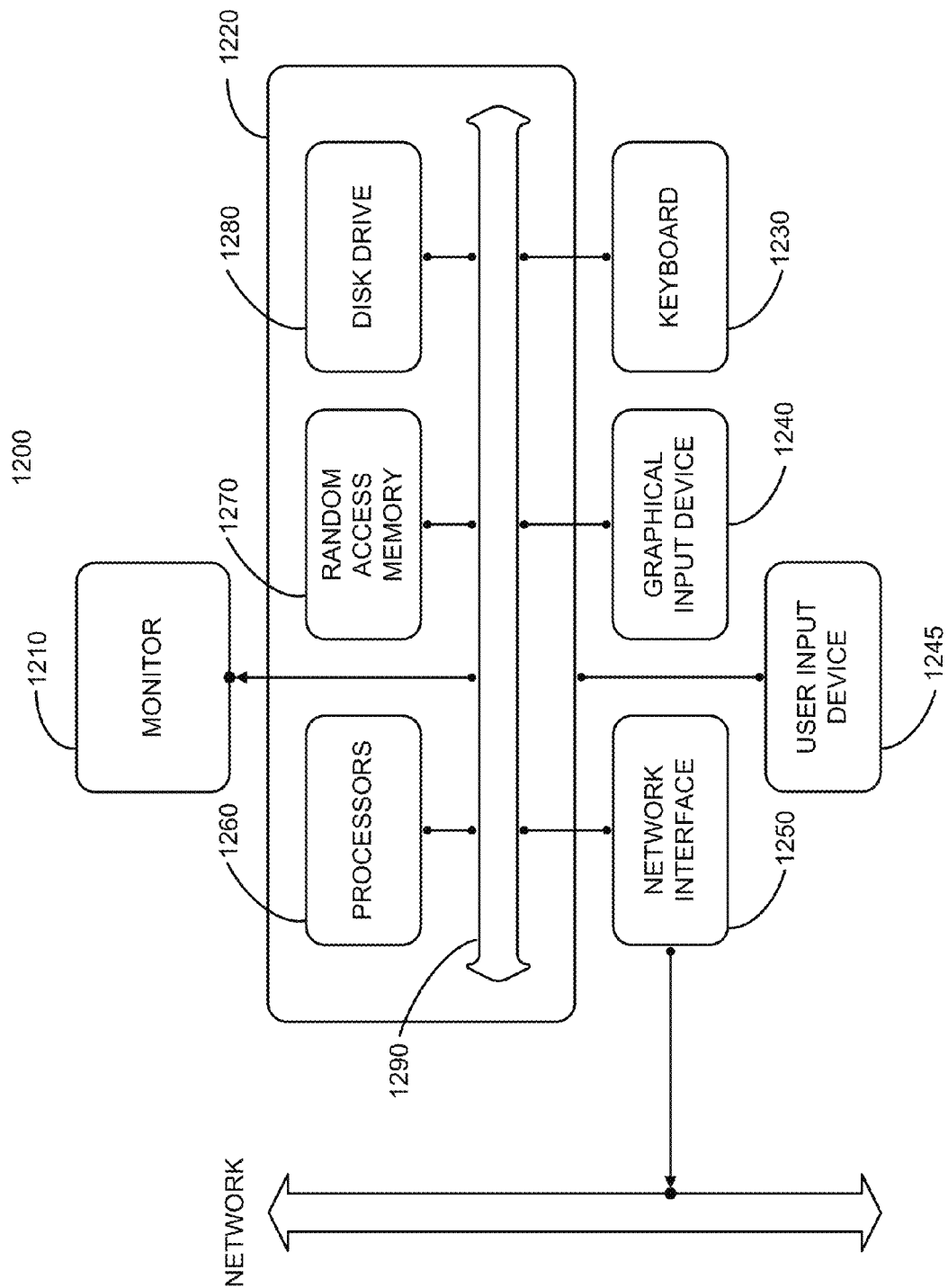
FIG. 12 is a block diagram of typical computer system configured to execute computer readable code to implement various functions and actions according to various embodiments of the present invention.

FIG. 12 is a block diagram of typical computer system 1200 configured to execute computer readable code to implement various functions, methods and actions according to various embodiments of the present invention.

System 1200 is representative of a computer system capable of embodying the present invention. The computer system can be present in any of the elements in FIGS. 1 through 7, including the map server 103, the image services module 104, service provider 105, cache server 107, or map client 110 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers.

Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1200 typically includes a display 1210, computer 1220, a keyboard 1230, a user input device 1240, computer interfaces 1250, and the like. In various embodiments, display (monitor) 1210 may be embodied as a CRT display, an LCD display, a plasma display, a direct-projection or rear-projection DLP, a microdisplay, or the like. In various embodiments, display 1210 may be used to display user interfaces and rendered images.

In various embodiments, user input device 1240 is typically embodied as a computer mouse, a trackball, a track pad, a joystick, wireless remote, drawing tablet, voice command system, and the like. User input device 1240 typically allows a user to select objects, icons, text and the like that appear on the display 1210 via a command such as a click of a button or the like. An additional specialized user input device 1245, such a magnetic stripe, RFID transceiver or smart card reader may also be provided in various embodiments. In other embodiments, user input device 1245 include additional computer system displays (e.g. multiple monitors). Further user input device 1245 may be implemented as one or more graphical user interfaces on such a display.

Embodiments of computer interfaces 1250 typically include an Ethernet card, a modem (telephone, satellite, cable, ISDN), (asynchronous) digital subscriber line (DSL) unit, FireWire interface, USB interface, and the like. For example, computer interfaces 1250 may be coupled to a computer network, to a FireWire bus, or the like. In other embodiments, computer interfaces 1250 may be physically integrated on the motherboard of computer 1220, may be a software program, such as soft DSL, or the like.

RAM 1270 and disk drive 1280 are examples of computer-readable tangible media configured to store data such user data, account data, merchant data, third-party service provider data, payment network data, abstraction layer databases and look-up tables and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1200 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1220 typically includes familiar computer components such as a processor 1260, and memory storage devices, such as a random access memory (RAM) 1270, disk drives 1280, and system bus 1290 interconnecting the above components.

In some embodiments, computer 1220 includes one or more Xeon microprocessors from Intel. Further, in the present embodiment, computer 1220 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code or other executable code may be stored as a series of instructions, or commands on a non-transitory or transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for operating a map server comprising:
    receiving, by a processor, a map request from a map client, the map request in a first map request format and having map properties including coordinates, symbology style, and projection;
    converting, by the processor, the first map request format into a second map request format, the second map request format including the map properties;
    generating, by the processor, a map signature using a hash function, the map signature based on map properties identified in the second map request format;
    associating, by the processor, the map signature with the map request;
    accessing, by the processor, a cache memory; and
    when the cache memory includes the map signature, retrieving, by the processor, a map associated with the map signature from the cache memory.

2. The method of claim 1 wherein when the cache memory does not include the map signature, the method further includes generating, by the processor, a map in response to the map request.

3. The method of claim 2 further comprising:
    associating the generated map with the map signature; and
    storing the generated map and the map signature to the cache memory.

4. The method of claim 3 wherein storing the generated map and the map signature to the cache memory includes sending the generated map and the map signature to a cache manager server computer.

5. The method of claim 4 further comprising receiving cache updates from the map server computer.

6. The method of claim 3 further comprising sending the retrieved or generated map associated with the map signature over a network interface to the map client.

7. The method of claim 1 wherein receiving the map request comprises generating a plurality of map tile requests based on the received map request.

8. The method of claim 1 wherein the hash function is an MD5 hash function.

9. A map server comprising:
   a network interface configured to communicate with an external network;
   one or more processors coupled to the network interface; and
   a cache memory coupled to the one or more processors,
   wherein the one or more processors are configured to execute computer readable code to:
      receive a map request message from a map client, the map request in a first map request format and having map properties including coordinates, symbology style, and scale;
      convert the first map request format into a second map request format, the second map request format including the map properties;
      generate a map signature using a hash function, the map signature based on the map properties identified in the second map request format;
      associate the map signature with the map request;
      access the cache memory;
      determine if the cache memory includes the map signature; and
      when the cache memory includes the map signature, retrieve a map associated with the map signature from the cache memory.

10. The map server of claim 9 wherein the one or more processors are further configured to execute computer readable code to send the retrieved map associated with the map signature to the map client over the network interface.

11. The map server of claim 9 wherein the one or more processors are further configured to execute computer readable code to generate a map in response to the map request message.

12. The map server of claim 10 wherein the one or more processors are further configured to execute computer readable code to send the map associated with the map signature to the map client over the network interface.

13. The map server of claim 11 wherein the one or more processors are further configured to execute computer readable code to send the retrieved or generated map associated with the map signature over the network interface to the map client.

14. The map server of claim 11 wherein the one or more processors are further configured to execute computer readable code to associate and store the generated map and the map signature in the cache memory.

15. The map server of claim 9 wherein the one or more processors are further configured to execute computer executable code to send updates to and receive updates from a cache manager.

16. A non-transitory computer-program product tangibly embodied in a machine-readable non-transitory storage medium including instructions to cause one or more processors to:
   receive a map request message from a map client, the map request in a first map request format and having map properties including coordinates, symbology style, and projection;
   convert the first map request format into a second map request format, the second map request format including the map properties;
   generate a map signature using a hash function, the map signature based on the map properties identified in the second map request format;
   associate the map signature with the map request;
   access the cache memory;
   determine if the cache memory includes the map signature; and
   when the cache memory includes the map signature, retrieve a map associated with the map signature from the cache memory.

17. The computer-program product of claim 16 wherein the one or more processors are further configured to execute computer readable code to send the retrieved map associated with the map signature to the map client over a network interface.

18. The computer-program product of claim 16 wherein the one or more processors are further configured to execute computer readable code to generate a map in response to the map request message.

19. The computer-program product of claim 17 wherein the one or more processors are further configured to execute computer readable code to send the map associated with the map signature to the map client over the network interface.

20. The computer-program product of claim 18 wherein the one or more processors are further configured to execute computer readable code to send the retrieved or generated map associated with the map signature over the network interface to the map client.

* * * * *